US012444881B2

(12) United States Patent
Semrau et al.

(10) Patent No.: US 12,444,881 B2
(45) Date of Patent: Oct. 14, 2025

(54) PLUG CONNECTION DEVICE

(71) Applicants: R. STAHL SCHALTGERÄTE GMBH, Waldenburg (DE); ODU GMBH & CO. KG, Mühldorf (DE)

(72) Inventors: Holger Semrau, Satteldorf (DE); Albrecht Hopf, Schnaitsee (DE)

(73) Assignees: R. STAHL SCHALTGERÄTE GMBH, Waldenburg (DE); ODU GMBH & CO. KG, Mühldorf (DE)

(*) Notice: Subject to any disclaimer, the term of this patent is extended or adjusted under 35 U.S.C. 154(b) by 285 days.

(21) Appl. No.: 18/021,876

(22) PCT Filed: Aug. 5, 2021

(86) PCT No.: PCT/EP2021/071925
§ 371 (c)(1),
(2) Date: Feb. 17, 2023

(87) PCT Pub. No.: WO2022/037963
PCT Pub. Date: Feb. 24, 2022

(65) Prior Publication Data

US 2024/0014597 A1 Jan. 11, 2024

(30) Foreign Application Priority Data

Aug. 17, 2020 (DE) ..................... 10 2020 121 535.5

(51) Int. Cl.
*H01R 13/629* (2006.01)
*H01R 13/533* (2006.01)
(Continued)

(52) U.S. Cl.
CPC ..... *H01R 13/62927* (2013.01); *H01R 13/533* (2013.01); *H01R 13/625* (2013.01); *H01R 13/633* (2013.01)

(58) Field of Classification Search
CPC ............ H01R 13/62927; H01R 13/533; H01R 13/625; H01R 13/633; H01R 13/631; H01R 24/005
See application file for complete search history.

(56) References Cited

U.S. PATENT DOCUMENTS 4,140,338 A 2/1979 Kazmierski, Jr. et al.
4,140,358 A 2/1979 Marechal
(Continued)

FOREIGN PATENT DOCUMENTS

CN 202759093 U 2/2013
CN 108808300 A 11/2018
(Continued)

OTHER PUBLICATIONS

German Grant Notice (non-English) dated Oct. 20, 2022; German Application No. 10 2020 121 535.5; 8 pages.
(Continued)

*Primary Examiner* — Travis S Chambers
(74) *Attorney, Agent, or Firm* — CANTOR COLBURN LLP

(57) ABSTRACT

A connector device including: a plug which has a plug housing and at least one electrical plug contact that is held so as to be insulated in the plug housing; and a socket which has a socket housing and a socket contact. The socket housing has an electrically insulating plug channel for receiving the plug contact, in which plug channel the socket contact is located. A sleeve is rotatably arranged on the plug housing or the socket housing. A slotted guide arrangement is operatively disposed between the sleeve, the plug housing and the socket housing. A slotted guide of the slotted guide arrangement has a separating portion having a slope relative to a circumferential direction. After the separating portion in
(Continued)

an opening direction, a delay portion is located, which has a smaller slope than the separating portion.

16 Claims, 7 Drawing Sheets

(51) Int. Cl.
*H01R 13/625* (2006.01)
*H01R 13/633* (2006.01)

(56) References Cited

U.S. PATENT DOCUMENTS

| | | | | | |
|---|---|---|---|---|---|
| 5,490,790 | A * | 2/1996 | Okada | H01R 13/4538 439/314 |
| 5,993,266 | A * | 11/1999 | Mayer | H01R 13/645 439/294 |
| 7,794,252 | B2 | 9/2010 | Sauer et al. | |
| 9,548,558 | B1 * | 1/2017 | Hsu | H01R 13/635 |
| 10,033,138 | B2 | 7/2018 | Pierce-Jones | |
| 2008/0311774 | A1 | 12/2008 | Sauer et al. | |
| 2010/0273342 | A1 | 10/2010 | Hankins et al. | |
| 2019/0148868 | A1 | 5/2019 | Pierce-Jones et al. | |
| 2020/0119499 | A1 | 4/2020 | Leischner et al. | |
| 2020/0266580 | A1 * | 8/2020 | Krome | H01R 13/635 |

FOREIGN PATENT DOCUMENTS

| | | | |
|---|---|---|---|
| DE | 2730660 | A1 | 1/1978 |
| DE | 202005010927 | U1 | 12/2006 |
| DE | 102017112160 | A1 | 12/2018 |
| EP | 2937946 | A1 | 10/2015 |
| EP | 3211727 | A1 | 8/2017 |
| EP | 3467957 | A1 | 4/2019 |
| GB | 2155985 | A | 10/1985 |
| KR | 20170139404 | A | 12/2017 |
| RU | 2407119 | C2 | 12/2010 |
| WO | 2007071968 | A2 | 6/2007 |

OTHER PUBLICATIONS

German Office Action (non-English) dated Aug. 17, 2020; German Application No. 10 2020 121 535.5; 7 pages.
German Office Action (non-English) dated Nov. 30, 2021; German Application No. 10 2020 121 535.5; 4 pages.
International Search Report (English Translation) dated Nov. 15, 2021; International Application No. PCT/EP2021/071925; 2 pages.
International Search Report (non-English) dated Nov. 15, 2021; International Application No. PCT/EP2021/071925; 4 pages.
Written Opinion (non-English) dated Nov. 15, 2021; International Application No. PCT/EP2021/071925; 7 pages.
Russian Office Action corresponding to RU Application No. 2023 101 599; Issue Date, Jul. 30, 2024.
Russian Search Report for International Application No. PCT/EP2021/071925; Mailing Date, Jul. 30, 2024.

* cited by examiner

PLUG CONNECTION DEVICE

CROSS REFERENCE TO RELATED APPLICATIONS

This application is a National Stage of PCT Application No. PCT/EP2021/071925 filed on Aug. 5, 2021, which claims priority to German Patent Application No. 10 2020 121 535.5 filed on Aug. 17, 2020, the contents each of which are incorporated herein by reference thereto.

TECHNICAL FIELD

The present disclosure refers to a plug connection device.

BACKGROUND

From the prior art DE 20 2005 010 927 U1 an explosion-proof plug connector is known. The plug connector comprises a plug part and a socket part. The plug part comprises a housing having an outer thread. The socket part comprises a housing. An outer sleeve surrounds the housing of the socket part. The outer sleeve comprises an inner thread. Thus, the outer sleeve can be screwed on the housing of the plug part, whereby the plug part and the socket part are attached to one another.

WO 2007/071 968 A2 discloses a plug connection device having a pin and a groove predefining a sequence of rotation and/or push movements of one part of the plug connection device relative to another part of the plug connection device for connecting or releasing. The groove may have a Z-shape with axial sections and a section having an inclination relative to the circumferential direction arranged inbetween thereof.

U.S. Pat. No. 10,033,138 B2 also discloses a connection device in which a groove and at least one cam define a movement sequence for release and connection. The groove has two axial sections and an intermediate section extending obliquely to the circumferential direction.

DE 10 2017 112 160 A1 shows an embodiment of a plug connection device having a groove and a cam, wherein the groove has sections extending in circumferential direction and sections extending in axial direction.

EP 3 467 957 A1 discloses a plug connector.

EP 3 211 727 A1 discloses a plug connection device having a holding extension and a holding cavity, wherein the holding extension and the holding cavity comprise a latch device having a latch section and a first counter latch section and a second counter latch section—when separating and also when connecting the parts of the plug connection device, the latch section latches first with one counter latch section and then with the additional counter latch section.

BRIEF SUMMARY

It is the object of the present disclosure to provide an improved concept for a plug connection device.

A plug connection device, including: a plug comprising a plug housing and at least one electrical plug contact held in the plug housing in an insulated manner, a socket comprising a socket housing and a socket contact, wherein the socket housing comprises a plug channel configured in an electrically insulated manner in which the socket contact is arranged, for receiving the plug contact, wherein a sleeve is rotatably arranged on the plug housing or the socket housing, a slotted guide arrangement arranged to be effective between the sleeve, the plug housing and the socket housing, a guide slot having a separation section comprising an inclination relative to a circumferential direction, wherein a deceleration section is arranged after the separation section in an opening direction, the deceleration section having a lower inclination than the separation section The plug connection device according to the present disclosure comprises a plug. The plug comprises a plug housing and at least one electrical plug contact held in the plug housing in an insulated manner. The plug connection device comprises a socket. The socket comprises a socket housing and a socket contact. The socket housing comprises a plug channel configured in an electrically insulated manner. The latter is configured for locating the plug contact therein. The socket contact is arranged inside the plug channel. On the plug housing or the socket housing a sleeve is rotatably arranged that can also be denoted as coupling sleeve or locking sleeve. The plug connection device comprises a slotted guide arrangement effectively arranged between the sleeve, the plug housing and the socket housing. The slotted guide arrangement preferably comprises a guide slot having a separation section. The separation section comprises an inclination relative to a circumferential direction. The guide slot comprises a deceleration section arranged behind the separation section in an opening direction having a lesser inclination relative to the circumferential direction than the separation section. The deceleration section can adjoin the separation section in opening direction.

According to the present disclosure, a plug connection device is provided, which can be operated intuitively, because the separation section preferably forces a rotation movement for releasing the connection between the plug and the socket that is transferred into a separation movement similar to a left-hand thread or alternatively to a right-hand thread.

The plug connection device is preferably configured in an explosion-proof manner, particularly preferably according to the protection category "flameproof enclosure" (Ex-d). By means of the deceleration section, the separation movement can be decelerated (with constant rotation speed), optionally down to zero, in order to provide sufficient time for extinction of a spark and/or cooling of hot explosion gases. During rotation of the sleeve in opening direction the arrangement of the separation section and deceleration section provides that the separation of the plug contact and the socket contact can be carried out quickly first and that the further separation movement can be carried out in a delayed or decelerated manner. This concept paves the way to a plug connection device that can be intuitively actuated and that allows to release the contact quickly for an establishing explosion-proof connection and to reduce or avoid excessive damage or wear of the plug contact and/or the socket contact.

Due to the inclination of the separation section, the guide slot and a cam engaging therein can drive the sleeve relative to the plug housing or the socket housing during rotation of the sleeve in opening direction concurrently in a separation direction and/or enforce such movement for rotation of the sleeve in order to move the plug housing and the socket housing or the plug and the socket in a separation direction. Vice versa the inclination of the separation section can result in that during rotation of the sleeve relative to the plug housing or the socket housing in closing direction the sleeve is moved in a connection direction relative to the plug housing or the socket housing in order to move the socket housing and the plug housing relative to one another in a connection direction toward each other.

Due to the low inclination of the separation section—this inclination can be zero for example, so that the separation section extends exclusively in circumferential direction—a continued separation movement if the plug relative to the socket is temporarily blocked or impeded or with constant rotation speed at least decelerated. The deceleration section preferably adjoins the separation section.

Additional features that embodiments of the plug connection device according to the present disclosure can comprise individually or in combination as an example are described in the following:

The plug connection device can have a spring mechanism, which is arranged in order to be effective between the sleeve, the plug housing and the socket housing. The spring mechanism is configured to store movement energy during movement of the sleeve for separation of the plug and the socket in order to release this energy subsequently during a continued separation movement to thereby separate the electrical contact between the plug contact and the socket contact or to further increase the distance of the plug contact and the socket contact from one another. Thus, it is possible to define that a specific section of the separation path, i.e. the disconnection of the plug contact and the socket contact and/or the continued movement of plug contact and socket contact away from one another, is traveled with a defined speed or at least a speed above a specific threshold in order to avoid an excessive occurring of spark creation between the plug contact and the socket contact and/or contact erosion. The plug contact and the socket contact can be suddenly separated from one another reliably by means of the spring mechanism. Any elastically deformable element, which is configured and provided to store mechanical energy in order to release this energy for support of a relative movement of plug contact and socket contact in a separation direction is considered as a spring.

The spring mechanism releases the movement energy preferably during movement of a cam along a subsection of the separation section.

Preferably the plug and the socket have a latch device. The latch device comprises a latch section and a first counter latch section. In addition the latch device can have a second counter latch section. The latch section is configured to selectively engage the first counter latch section and, if present, the second counter latch section. The latch device defines at least two sites (holding sites) at which a continued separation movement is only possible after application of a minimum force or vice versa a continued connection movement is only possible after application of a minimum force.

Preferably the latch device and the slotted guide arrangement are configured so that the latch section and the first counter latch section are disengaged during guidance of a cam through the separation section.

Preferably the plug or the socket comprises a holding cavity. The holding cavity is configured for locating a holding extension therein that is arranged on or supported by the respective other part, the socket of a plug. The holding extension and the holding cavity are preferably not configured for establishment of an electrical connection between the holding extension and the holding cavity.

Preferably the latch section is arranged on the holding extension, e.g. formed thereon. The first counter latch section is preferably arranged at a first position in the holding cavity. If present, the second counter latch section is preferably arranged at a second position in the holding cavity.

The plug connection device is preferably configured so that during or as a result of the guidance of a cam through the separation section (by means of rotation of the sleeve), the latch section can be brought into engagement with the second counter latch section and/or can be brought out of engagement with the first counter latch section.

Preferably the plug contact and the socket contact are moved relative to one another in a separation direction away from one another during guidance of a cam through the separation section, and indeed preferably at least in part due to the energy released from the spring mechanism. The spring mechanism preferably impedes keeping the plug contact and the socket contact in a distance in which contact erosion occurs increasingly. The spring mechanism alone or in cooperation with an additional device of the plug connection device ensures a reliable separation of the plug contact and the socket contact from each other.

For this reason a force applied from the spring mechanism for moving the plug contact and the socket contact relative to one another in separation direction is preferably larger than a friction force between the latch section and a support of the counter latch section or the counter latch sections. The mechanical energy is therefore automatically released at a location during guidance of the cam through the separation section and results in a (further) displacement of plug contact and socket contact away from one another.

Preferably the force applied by the spring mechanism is larger than a friction force between the plug contact and the socket contact and/or between the plug and the socket. Preferably the force of the spring mechanism is sufficient, at least at a specific point or site along the path for separating the plug contact and the socket contact and/or the plug and the contact in order to overcome the static friction or sliding friction force at this site.

The force applied by the spring mechanism is preferably larger than the sum of the friction forces between the latch section and the support of the counter latch section or the counter latch sections and the friction force between the plug contact and the socket contact that have to be overcome in order to separate or reliably displace the plug contact and the socket contact from one another. The force applied by the spring mechanism may only be larger than the sum of the forces at a site, at which the first latch section and the first counter latch section are already disengaged or in the course of the disengagement of the latch section and the first counter latch section.

The spring element of the spring mechanism is preferably an element that is separate from an elastically deformable storage element of the latch device. The spring mechanism preferably does not require a gear, preferably without wedge gear. The spring mechanism stores the force preferably in separation direction, particularly in axial direction.

Preferably a cavity is formed in the locking section and/or adjacent to the separation section in which a cam is brought into engagement, particularly in case of an explosion, between the plug contact and the socket contact. The engagement is to be regarded relatively. Also the cavity can be moved so that the cam gets into engagement relative thereto. In doing so, a continued rotation or movement of the sleeve in opening direction can be temporarily hampered or blocked in order to ensure that hot explosion gases can cool down before plug contact and socket contact can be further moved from one another in separation direction. Between the cam and the cavity preferably a form-fit is established when the cam engages the cavity, that has to be overcome, preferably against a friction force and/or spring force, in order to further or finally separate the plug and the socket.

When the cam is engaging the cavity, the spring mechanism can be configured to keep the cam therein, at least temporarily, so that a holding force has to be overcome for rotating the sleeve in opening direction.

The guide slot can have additional sections in addition to the separation section and the de deceleration section. For example, the guide slot can comprise a locking section, wherein the separation section is arranged behind the locking section in opening direction. The locking section blocks a separation movement (e.g. in axial direction) of the plug contact relative to the socket contact. In opening direction behind the locking section means that the cam is first guided through the locking section and then through the separation section in order to separate the plug contact and the socket contact from each other. For this the sleeve has to be rotated in its own opening direction.

The guide slot preferably comprises a release section behind the deceleration section in opening direction, the release section allowing a further movement of the plug contact and the socket contact and/or the plug and the socket in separation direction.

BRIEF DESCRIPTION OF THE DRAWINGS

Additional features and exemplary embodiments are derived from the dependent claims, the following description as well as the figures. The drawings show schematically and by way of example:

DETAILED DESCRIPTION

Figure 1:
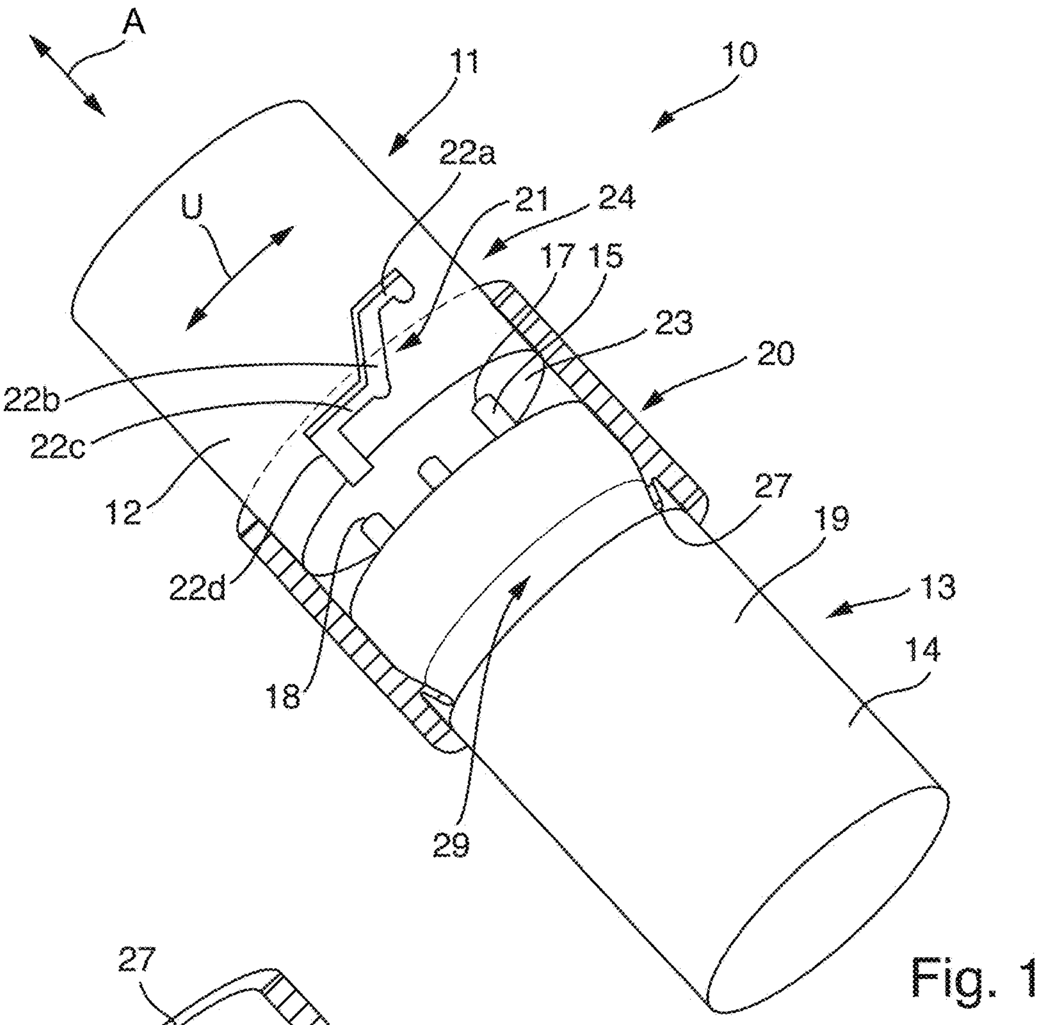
FIG. 1—a plug connection device according to the present disclosure in simplified perspective, partly intersected illustration, FIG. 2*a*—a sleeve of the plug connection device according to FIG. 1 in a sectional perspective illustration, FIG. 2*b*—a sectional illustration for illustration of plug channel and plug contact, FIG. 3—an embodiment of a holding extension and a holding cavity for receiving the holding extension, e.g. of the plug connection device according to FIG. 2-2, FIGS. 4*a-d*—highly schematic illustrations of features of an embodiment of a plug connection device according to the present disclosure as well as a disconnection sequence, FIGS. 5*a-h*—a highly schematic illustration of features of an embodiment of a plug connection device according to the present disclosure and a disconnection sequence.

An example of a plug connection device 10 is schematically illustrated in FIG. 1. A socket 11 having a socket housing 12 and a plug 13 having a plug housing 14 supporting one, preferably multiple plug contacts 15, are part of the plug connection device 10. The plug contacts 15 extend parallel to one another in axial direction A. The axial direction A coincides with the attachment direction (also connection direction) or the separation direction (arrow) respectively, in which the socket housing and the plug housing 14 are moved toward or away from each other in order to separate the plug contacts 15 from socket contacts 16*a* (also denoted as jack contacts).

In the socket housing 12 openings 17, 18 are provided which are part of the plug channel 16 (see FIG. 2*b*) and which are assigned to the plug contacts 15. Inside thereof the socket contacts 16*a* are arranged that are illustrated by way of example in the illustration of the embodiment according to FIG. 5.

A cylinder surface is formed on the plug housing 14 that is orientated concentrically relative to the attachment or plug direction A. On the cylinder surface 19 a sleeve 20 (which can also be denoted as locking bushing) is held that can be rotated in circumferential direction (arrow U in FIG. 1) around the axial direction A (arrow A in FIG. 1) at least in a limited manner.

In FIG. 1 the sleeve 20 is illustrated in longitudinally intersected manner in order to allow the view onto the plug contacts 15 as well as onto a slotted guide arrangement 21. Part thereof is a guide slot 22, which is formed in a cylindrical section 24 of socket housing 12 adjoining the face 23 of socket housing 12, the cylinder surface of which defines a circumferential direction U. The cylindrical section 24 is orientated concentrically relative to the axial direction A. The guide slot 22 is arranged in a section of the socket housing 12 over which the sleeve 20 extends when socket housing 12 and plug housing 14 are completely joined.

As also apparent from FIGS. 4*a-d* as well as 5*a-g* the guide slot 22 comprises a locking section 22*a* extending in circumferential direction U. Alternatively, the locking section 22*a* can have an inclination or an angle relative to the circumferential direction U that is different from 0°. The object of the locking section 22*a* is to block a separation movement in separation direction A, if the sleeve 20 is inside a specific range of rotation positions around the axial direction A. At the end of the locking section 22*a*—the start if a separation movement is considered—a cavity 26 is formed.

A section of the guide slot 22 denoted as separation section 22*b* adjoins the locking section 22*a*. The separation section 22*b* comprises an inclination relative to the circumferential direction U. In other words the longitudinal extension direction of the separation section 22*b* comprises a component in circumferential direction U that is not negligible and also a component in axial direction A that is not negligible. The inclination or the angle is larger than an inclination of the locking section 22*a* that can be present. Due to the inclination, the separation section 22*b* includes a reflex angle with circumferential direction U.

In the illustrated embodiment a deceleration section 22*c* of guide slot 22 adjoins the separation section 22*b*. The deceleration section 22*c* is exclusively orientated in circumferential direction U in the illustrated embodiments. Alternatively, it can also comprise an inclination relative to the circumferential direction U that is less than the inclination of the separation section 22*b*. Consequently, the longitudinal extension direction of the deceleration section 22*c* can comprise a component in axial direction A (in separation direction) that is not negligible.

Figure 2A:
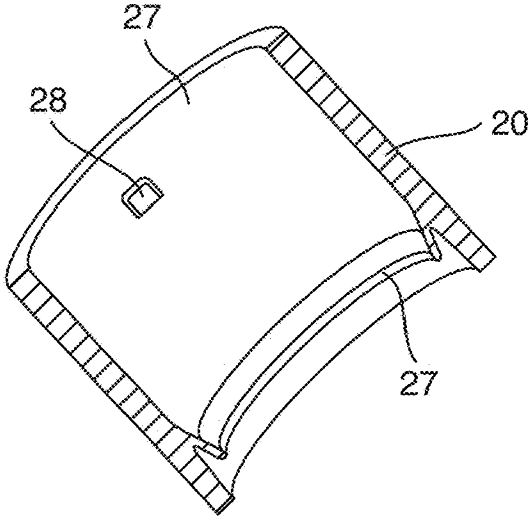
Figure 2B:
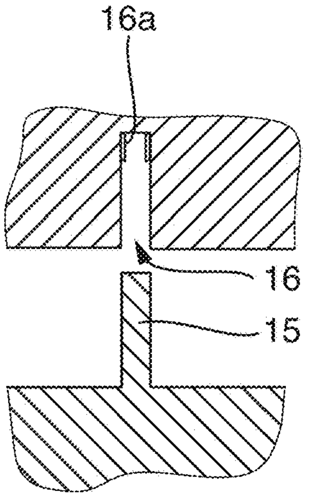

At its inner surface sleeve 20 comprises a cam 28 orientated toward the interior, as apparent from FIG. 2*a*, which is assigned to the guide slot 22 in the socket housing 12 and engages therein upon joining the plug housing 14 and the socket housing 12. The cam 28 for the guide slot 22 on the socket housing 12 can be configured as rigid cam 28 or as radially spring-elastic cam 28.

Preferably a coupling between sleeve 20 and plug housing 14 allows an axial movement of sleeve 20 relative to the plug housing 14. In preferred embodiments sleeve 20 cannot only be rotated around the axial direction A on the plug housing 14, but is also movable in axial direction A on the plug housing 14. For this purpose a ring shaped projection 27, as is illustrated in FIG. 2*a*, can engage into a groove-like ring-shaped cavity 29 in the plug housing, the width of the cavity defining the amount of the axial range of motion of sleeve 20 on the plug housing 14.

Preferably sleeve 20 can be slidably moved in axial direction A against a spring force of at least one elastical element 30*a*, 30*b* of a spring mechanism 30. The spring mechanism 30 is not illustrated in FIG. 1, however, schematically illustrated in the embodiments according to FIGS. 4*a*-4*d* as well as less schematic in the embodiment according to FIGS. 5*a*-5*h*. The sleeve 20 is also preferably supported with axial mobility on a socket housing 12, as an option against a spring force of an elastical element 30*a*, 30*b*.

While the figures show embodiments in which the guide slot 22 is formed in the socket housing 12, it is alternatively possible to form a guide slot 22 into the plug housing 14. The sleeve 20 can be held on the socket housing 12 accordingly. Alternatively or additionally, it is also possible and different then illustrated in the figures, to form the guide slot 22 into the inner side of the sleeve. The cams 28 would then be supported by plug housing 14 or socket housing 12 respectively.

The embodiment shown in FIG. 1 can comprise a holding cavity 32, e.g. in the socket housing 12 or in the socket 11, for receiving a holding extension 33 formed on the counter part, i.e. the plug 13 or the socket 11. In FIGS. 4*a*-4*d* a holding device 31 having a holding cavity 32 and a holding extension 33 is schematically illustrated. FIGS. 3 and FIGS. 5*a*-5*h* show less schematic illustrations of exemplary holding devices 31.

The holding extension 33 forms a latch section 34 and on the holding cavity 32 a first counter latch section 35 and preferably a second counter latch section 36 are formed. The counter latch sections 35, 36 define two holding locations on respective flanks 35*a*, 36*a* during the opening or separation movement of the plug from the socket.

Figure 3:
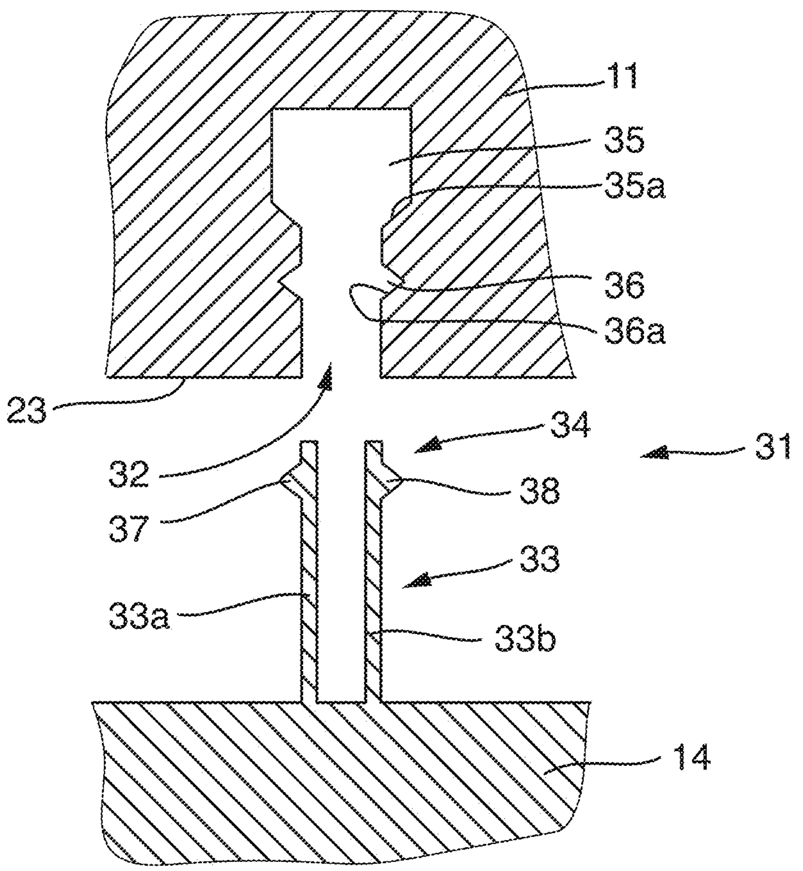

As apparent from FIG. 3, the holding extension 33 can be realized by two spring-elastically configured holding sections 33*a*, 33*b*, for example. They comprise blunt, e.g. round or ball-shaped, or pointed latch teeth 37, 38. The holding cavity 32 comprises respective cavities forming the first counter latch section 35 and the second counter latch section 36. For example, the holding extension 33 can be arranged between the plug contacts 15. The holding cavity 32 can be arranged between the plug channels, for example.

FIGS. 4*a*-4*d* show in a highly schematic manner a part of a plug connection device 10 according to the present disclosure, e.g. according to FIG. 1. Only a section of the plug housing 14 and only a section of the socket housing 12 are shown. The sleeve 20 is highly schematically and partly transparently shown in FIGS. 4*a*-4*d*. The latch device 34 with latch section 34 and first counter latch section 35 and second counter latch section 36 is highly schematically shown in FIGS. 4*a*-4*d* arranged on the outer side of plug housing 14 and socket housing 12. While such an arrangement is possible in general, the latch section or the latch sections 34 can also be formed on a holding extension 33*a*, 33*b* and first counter latch section 35 and second counter latch section 36 can be formed on a holding cavity 32, as apparent by way of example from FIG. 3 and FIGS. 5*a*-5*h*.

For separating the plug 13 and the socket 11, it can be proceeded as follows (FIGS. 4*a*-4*d*):

Due to the rotation position of sleeve 20, cam 28 can be arranged at the beginning of locking section 22*a* of the guide slot 22. The cam 28 can be pulled or pushed into the cavity 26, e.g. by means of an elastically deformed element. The element can be the elastical element 30*a*, 30*b* of spring mechanism 30. Where appropriate, cam 28 has to be moved out of cavity 26 into the portion of the locking section 22*a* extending in circumferential direction U. The sleeve 20 is rotated in opening direction, whereby cam 28 is moved in circumferential direction U through the locking section 22*a* toward the separation section 22*b*. The separation section 22*b* adjoins the locking section 22*a*, which exclusively extends in circumferential direction U, by means of a bend 39 of more than 90°, but less than 180° (reflex angle).

Illustration 4*b* shows the cam 28 inside separation section 22*b*. Because of the partly axial movement in the separation section 22*b*, the latch tooth 38 or the latch tooth 39 is further moved axially inside the first latch cavity, which forms the first counter latch section 35, and now abuts against a flank 36*a* of the first counter latch section 35, which limits the first latch cavity. In order to be able to further move cam 28 through the separation section 22*b* at this holding site, a holding force has to be overcome in that by pulling of plug 13 and socket 11 in opposite directions and/or (concurrent) rotation of sleeve 20 in opening direction (rotation in opening direction similar to a right-hand or left-hand thread) the latch tooth 37, 38 is urged against flank 36*a* so strongly that in turn the latch section 34 or the holding sections 33*a*, 33*b* are so highly deformed until finally the latch engagement between latch tooth 37, 38 and the first counter latch section 35, 36 is overcome and an additional separation path is suddenly allowed. Thereby, plug contact 15 and socket contact 16*a* are suddenly separated, which reduces the probability of spark creation and also the occurrence of contact erosion.

The plug connection device 10 is preferably explosion proof according to the explosion-proof category explosion-proof enclosure. Because inspite of the sudden separation of plug contact 15 and socket contact 16*a*, a spark formation and as a result an explosion between plug contact 15 and socket contact 16*a* may result. However, gaps between plug contact 15 and plug channel 16 are dimensioned so long and narrow that hot gas and/or particles can escape from the interstice between plug contact 15 and plug channel 16 at the very most cooled in a manner, so that they are cooled down previously to a non-ignitable temperature. In order for sufficient time to be provided for this and the gap is not opened too wide, so that hot gas and/or particles cannot sufficiently cool down, measures are taken according to the present disclosure that contribute individually or in combination to avoid this.

In case of an explosion, cam 28 can be pushed into the cavity 40 that is arranged at the beginning of the deceleration section 22*c* and a continued separation of plug 13 and socket 11 relative to one another or from one another is only possible when plug 13 and socket 11 are moved in the opposite direction sense (attachment direction sense, connection direction sense), so that cam 28 can be moved out of cavity 40 and then the sleeve 20 can be further rotated, so that cam 28 is moved through the deceleration section 22*c* toward the release section 22*d*.

Because of the less inclination of the deceleration section 22*c* relative to the separation section 22*b*, the axial separation movement of plug 13 and socket 11 relative to each other is decelerated at this location in order to provide sufficient time so that hot explosion gas and/or particles can cool down. Finally, the latch tooth 37, 38 is engaged into the second latch cavity 36 after the sudden disengagement of latch tooth 37, 38 and the first latch cavity 35 and a movement of plug 13 and socket 11 relative to one another in separation direction requires overcoming of a holding force between latch tooth 37, 38 and the second counter latch section 36, particularly a second flank 36*a*.

Figure 4A:
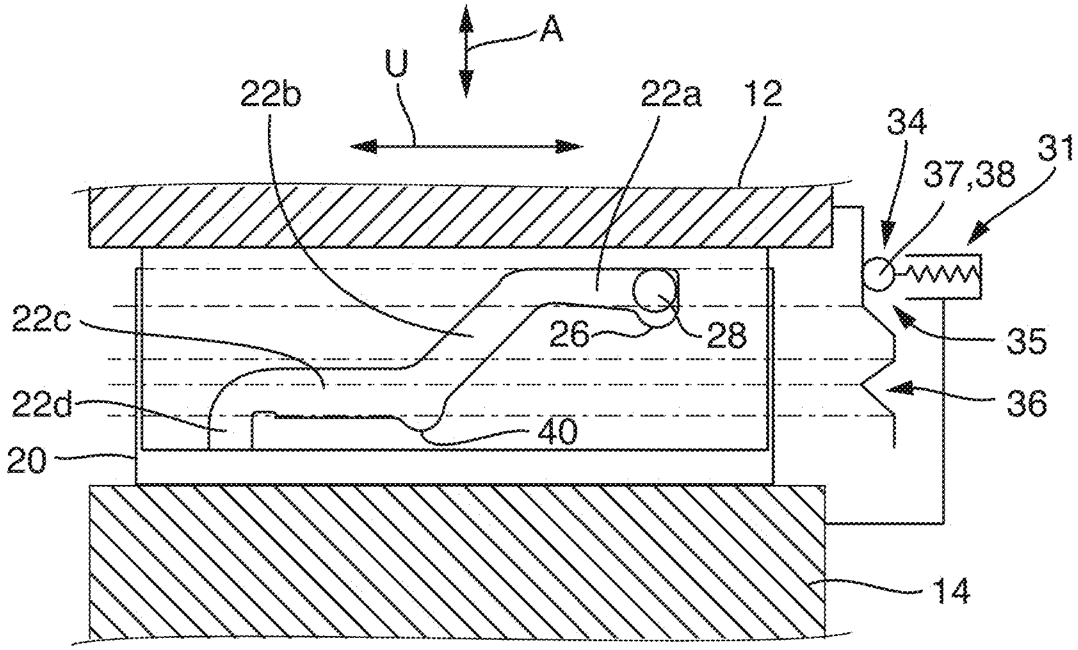
Figure 4B:
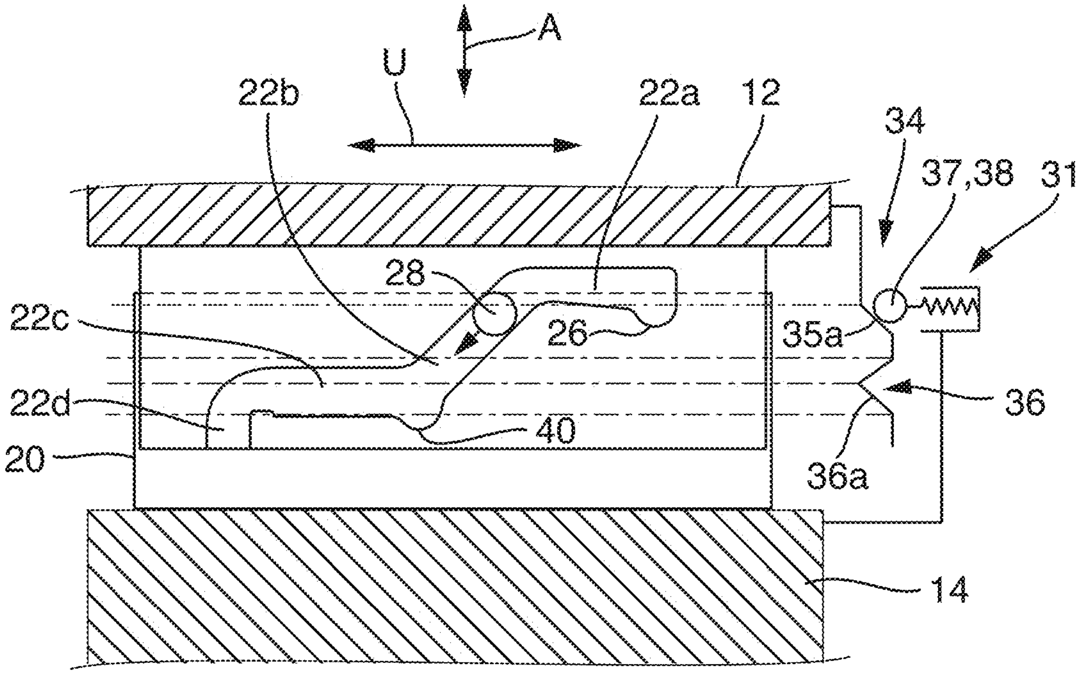
Figure 4C:
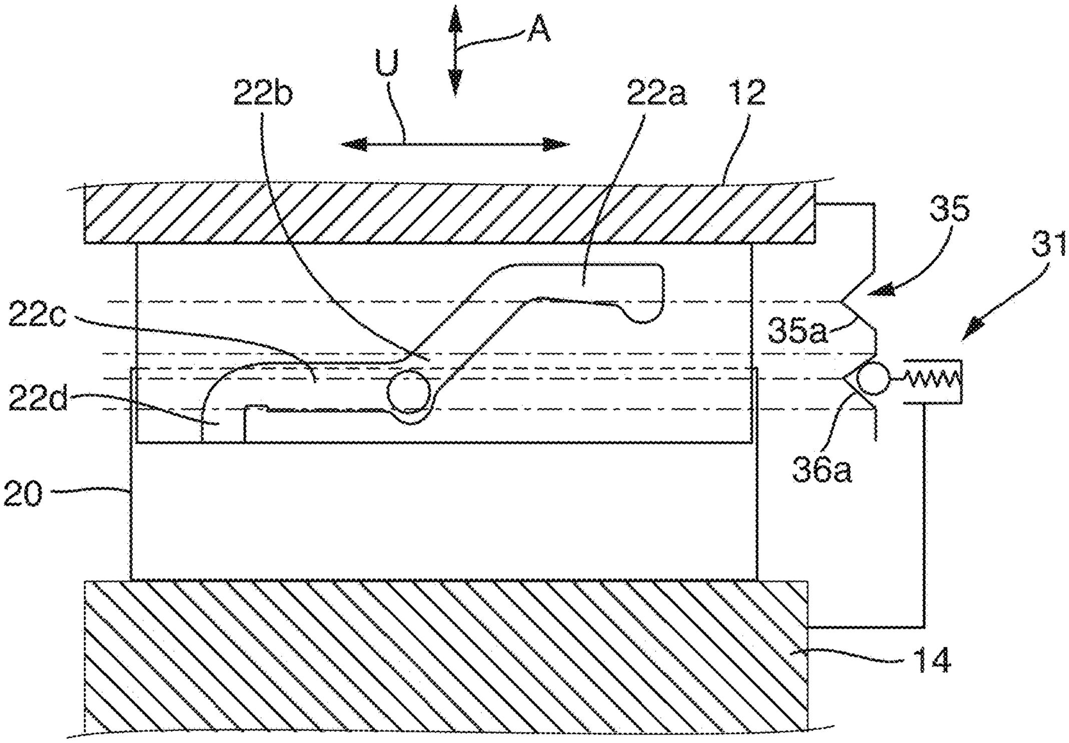
Figure 4D:
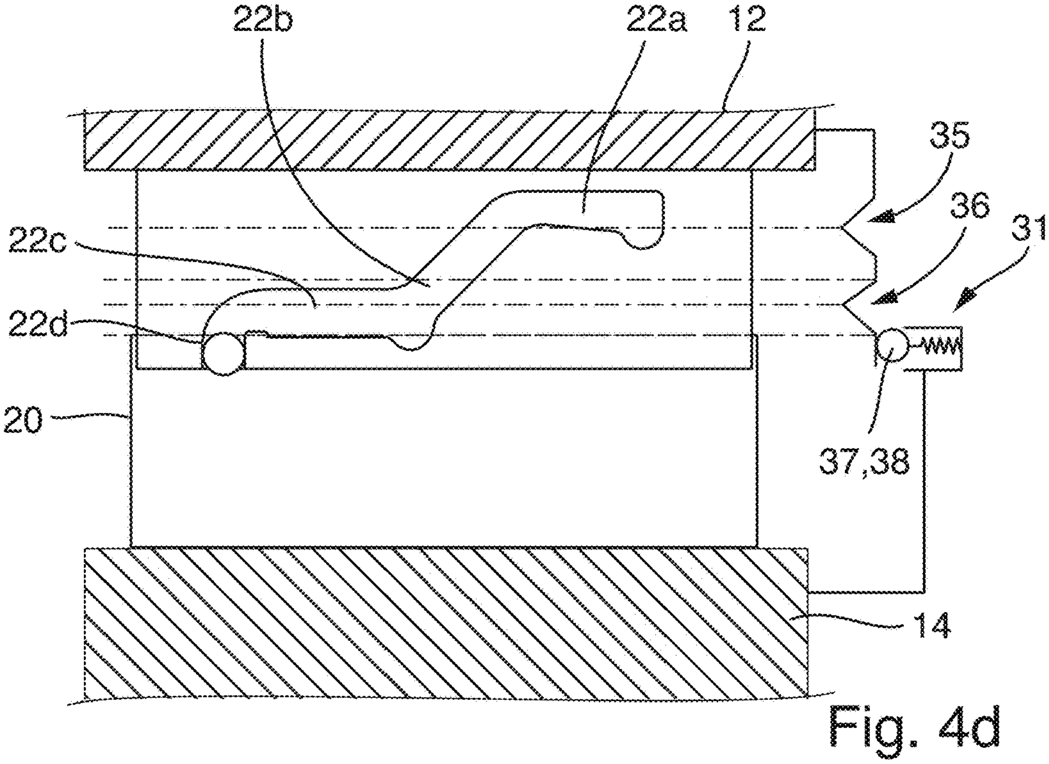

Even if cam 28 is guided through the deceleration section 22*c* into the release section 22*d* by rotation of sleeve 20, a final separation can only be carried out, if the holding force at the holding location between the latch teeth 37, 38 on one hand and the second counter latch section 36 is overcome by deforming the latch section 34 of holding extension 33. FIG. 4*d* shows the latch tooth 37, 38 disengaged from the second counter latch section 36.

FIGS. 5*a*-5*h* illustrate a separation process in another embodiment of the plug connection device 10 according to the present disclosure. The description with regard to FIGS. 1-4*d* applies accordingly for the description, unless it is stated differently in the following:

The embodiment according to FIGS. 5*a*-5*h* comprise a spring mechanism 30 that allows an axial movement of sleeve 20 relative to the plug housing 14 against a spring force during guidance of cam 28 through separation section 22*b*. The spring mechanism 30 stores the spring force in axial direction A. The spring mechanism 30 can therefore be realized without transmission, preferably without wedge transmission, in order to transfer an axial movement into a storage movement, e.g. in circumferential direction U. The elastically deformable storing element 30*a*, 30*b* (spring) of spring mechanism 30 is schematically illustrated as compression spring in FIGS. 5*a*-5*h*.

For separation of plug contact 15 and socket contact 16*a* or plug 13 from socket 11, the user rotates sleeve 20 in a rotation direction counter clockwise (opening direction) as the user is used to it for opening a right-hand threaded connection. Alternatively, the guide slot 22 can be orientated so that the user has to rotate the sleeve 20 in clockwise direction for opening, just as in case of a left-hand threaded connection. Prior to that it can be necessary to move the sleeve 20 a little further onto the socket housing 12 in order to move cam 28 out of cavity 26 at the beginning of the locking section 22*a* of guide slot 22 in order to thereby allow the rotation movement. Thereby it can be necessary to act against a spring force, e.g. of spring elements 30*a*, 30*b* of spring mechanism 30. The movement in axial direction A can be carried out automatically when the user rotates sleeve 20 with sufficient force and thereby overcomes the friction force between cam 28 and the wall of guide slot 22 at the cavity 26. The rotation movement is partly transferred in an axial movement in order to disengage cam 28 and the cavity.

Figure 5A:
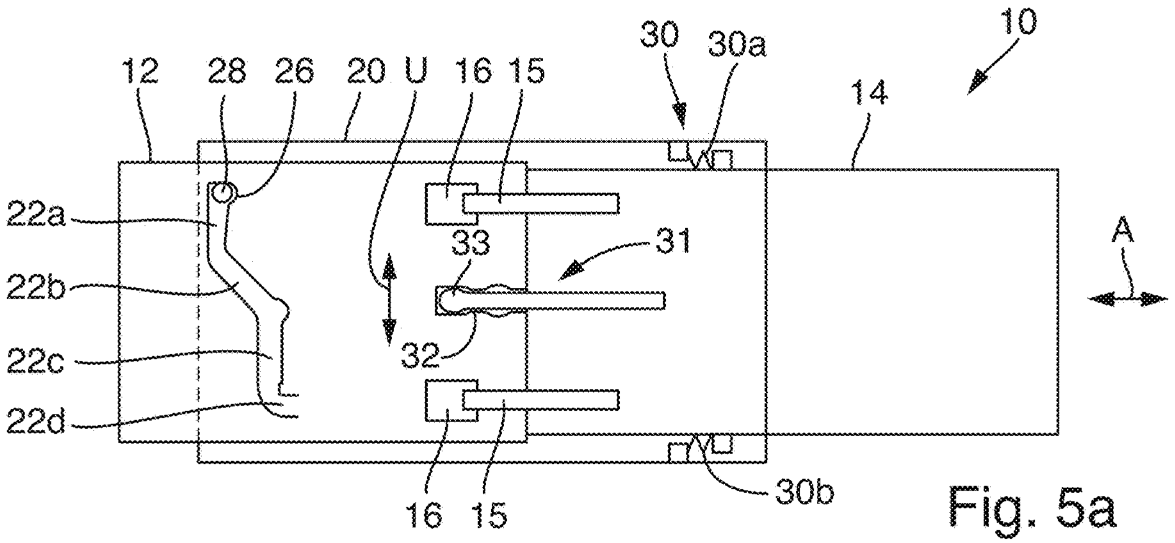
Figure 5B:
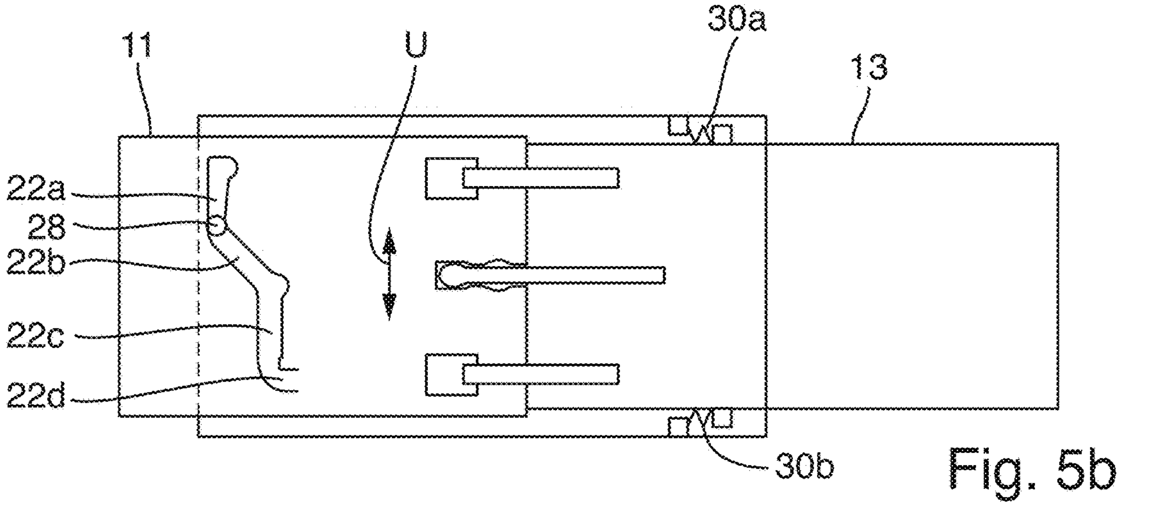

Due to the rotation movement, the user guides cam 28 through the locking section 22*a*. FIG. 5*b* shows cam 28 at the transition between the locking section 22*a* and the separation section 22*b*. When cam 28 is guided through the locking section 22*a*, if the latter is exclusively orientated in circumferential direction U, no separation movement between plug 13 and socket 11 results.

Figure 5C:
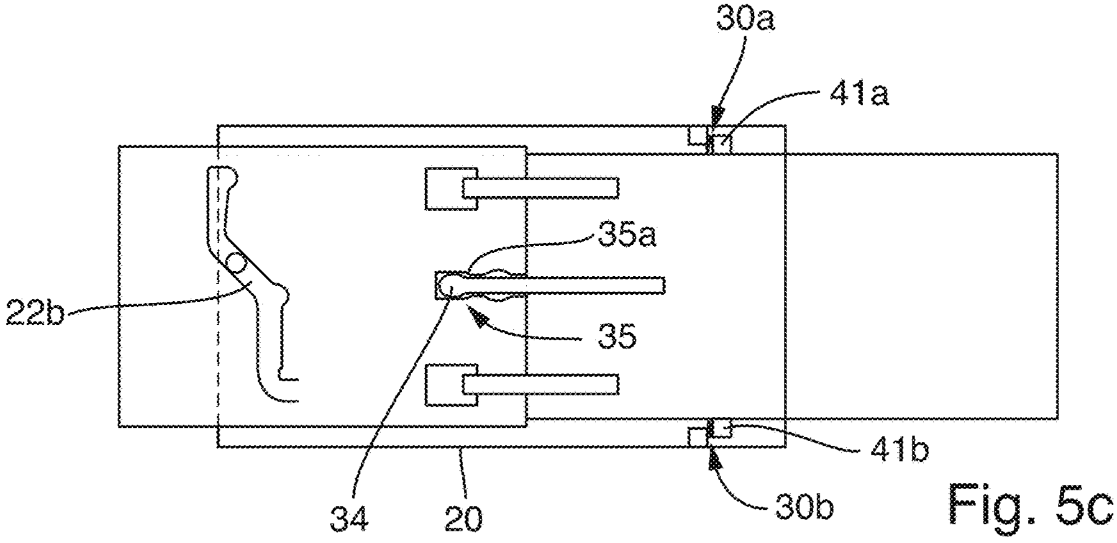

Due to a further rotation movement at sleeve 20, the cam 28 is guided through the separation section 22*b*. The guide slot 22 or the separation section 22*b* results in a forced guidance of cam 28 that in turn results in that a rotation movement on sleeve 20 is partly transferred into an axial movement of sleeve 20, similar to a thread. During the axial movement spring element or spring elements 30*a*, 30*b* of spring mechanism 30 is/are elastically deformed, as illustrated in FIG. 5*c*, and stores mechanical energy. Preferably the spring stiffness or resistance of the spring element 30*a*, 30*b* against elastic deformation is selected so that the latch section 34 of the latch device is urged against a flank 35*a* (see FIG. 3) of first counter latch section 35, but that the force for deformation of the spring element 30*a*, 30*b* is at least first insufficient to overcome the holding force due to the latch device.

In embodiments, as illustrated in FIG. 5*c*, the spring element 30*a*, 30*b* of spring mechanism 30 can be compressed up to a respective stop 41*a*, 41*b* or the spring element 30*a*, 30*b* can become so hard that subsequently a further axial movement of sleeve 20—for example transferred from a rotation movement of sleeve 20 as in the case of a thread and/or supported by an axial movement of sleeve 20 by the user—is transferred into an axial movement of plug 13 away from socket 11. For this the force must be sufficient to overcome the holding force between the latch section 34 and the first counter latch section 35 of the latch device.

Figure 5D:
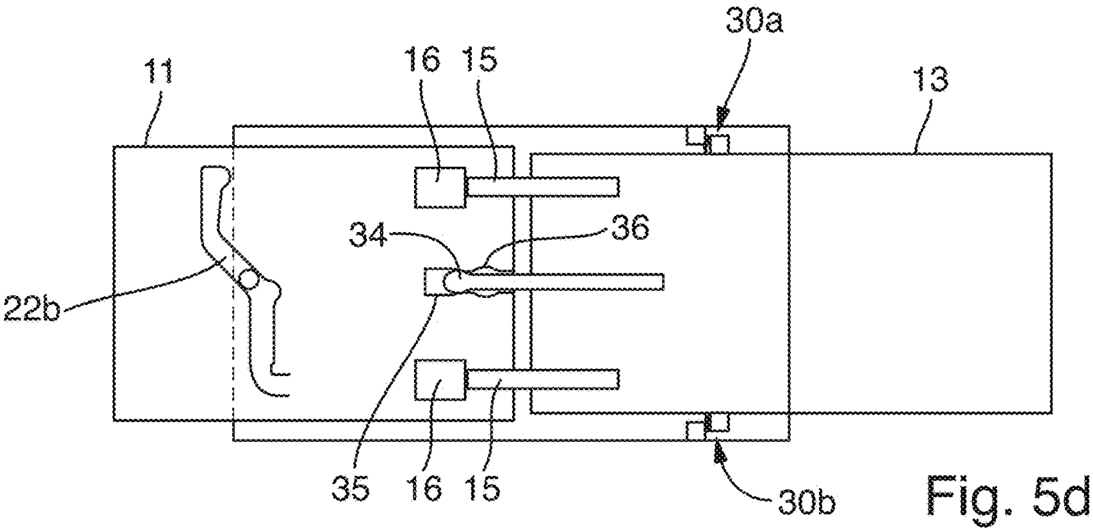
Figure 5E:
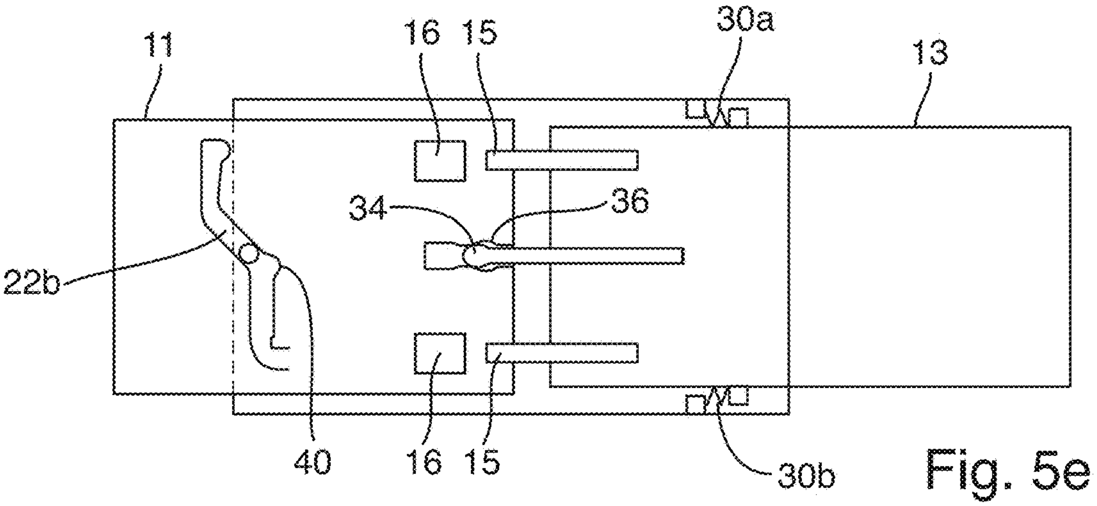
Figure 5F:
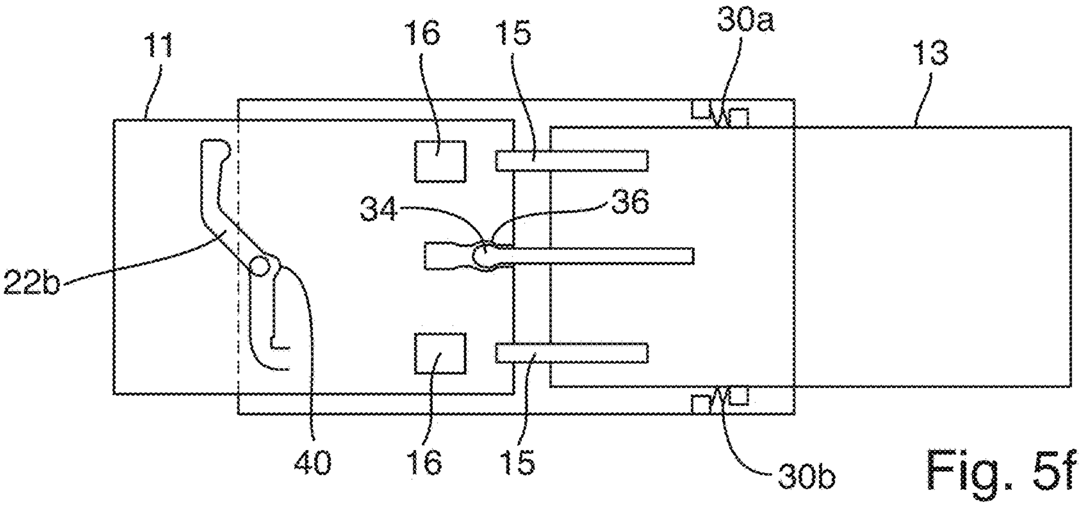

The disengagement of latch section 34 and the first counter latch section 35 and the sudden release of the stored energy from the spring mechanism 30 or the sudden decompression of spring elements 30*a*, 30*b* is shown in the sequence in FIGS. 5*d* and 5*e*. As shown in FIGS. 5*d*-5*f*, the electrical contact between plug contact 15 and socket contact 16*a* is separated during transition of engagement between latch section 34 and first counter latch section 35 to the engagement between latch section 34 and second counter latch section 36. Because a minimum force is required for disengaging first counter latch section 35 and latch section 34, thereby a minimum separation speed is defined that the plug contact 15 and the socket contact 16*a* have relative to one another during separation.

In order to exclude incorrect operation—for example to exclude keeping the plug contact 15 and the socket contact 16*a* in a separated position, however, a position in which high contact erosion occurs—the movement of plug 13 relative to socket 11 is partly driven by means of the decompressing spring element 30*a*, 30*b* in the phase of disengagement of latch section 34 and first counter latch section 35 and of engagement of latch section 34 and second counter latch section 35. The spring mechanism namely discharges its mechanical energy automatically, as apparent from the sequence of FIGS. 5*d*-5*g*, in the course of the movement of cam 28 through the separation section 22*b*, as soon as the force blocking this release due to the engagement of first latch section 34 and first counter latch section 35, is less than the force of the deformed spring element 30*a*, 30*b*.

This supports a movement of plug contact 15 and socket contact 16*a* relative to one another in separation direction, if they still are in contact or if the contact has just been separated, however, the plug contact 15 and the socket contact 16*a* are still so close to one another that increased contact erosion has to be feared.

If during separation of plug contact 15 and socket contact 16*a* an explosion between plug contact 15 and socket contact 16*a* occurs, the engagement of latch section 34 and first counter latch section 35 guarantees that the gap between the plug contact 15 and the socket channels remains so narrow that hot explosion gases and/or particles can escape from the interstice between plug contact 15 and socket contact 16*a* only sufficiently cooled so that an atmosphere outside the interstice, particularly outside the plug connection device 10, cannot be ignited. In addition or as an alternative, the cavity 40 on the deceleration section guarantees for this, as already described in relation to FIGS. 4*a*-4*d*.

FIG. 5*f* shows the plug connection device 10 with cam 28 being in engagement with cavity 40 and with latch section 34 engaging the second latch cavity 36. In order to completely separate plug 13 and socket 11, cam 28 has to be guided through the deceleration section 22*c* on one hand, which requires time that remains for cooling down potentially produced explosion gases. In addition, as apparent from the sequence of FIGS. 5*g*-5*h*, latch section 34 and second counter latch section 36 have to be brought out of engagement. This is only possible when cam 28 is in release section 22*d*.

Figure 5G:
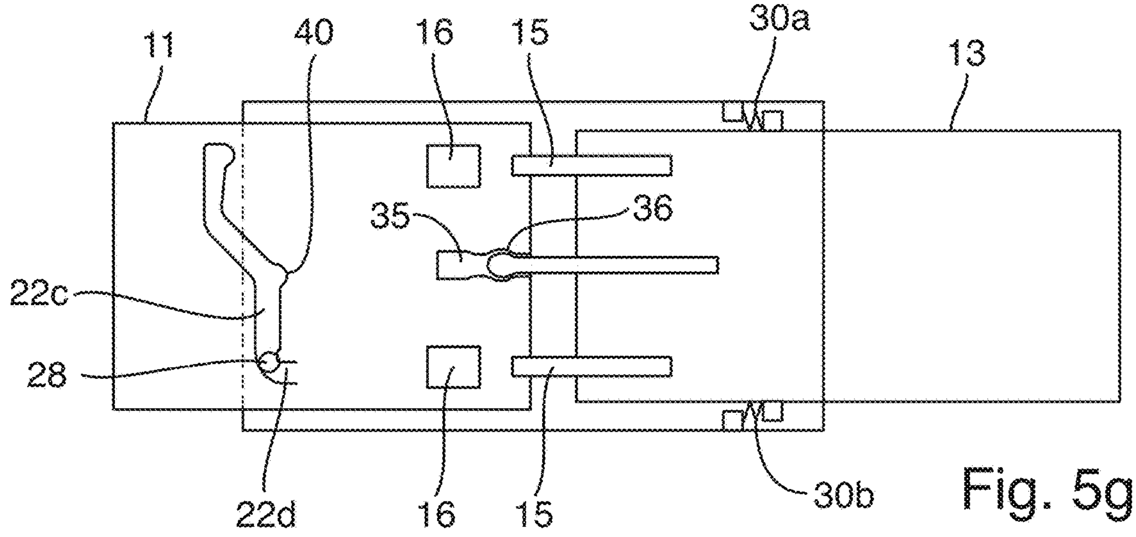
Figure 5H:
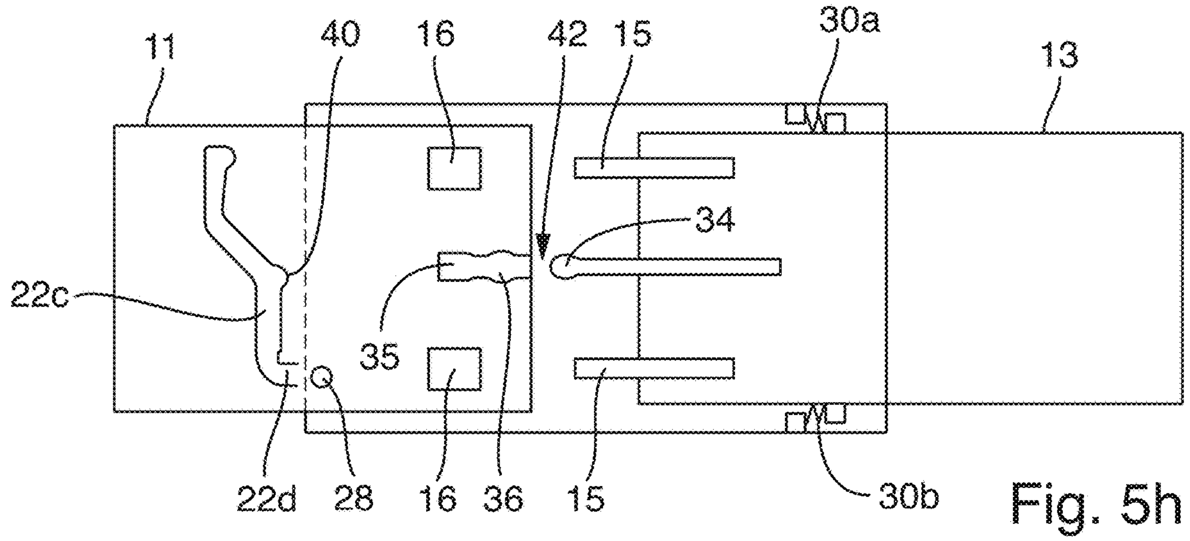

FIG. 5*g* shows cam 28 on the release section 22*d* adjoining the deceleration section 22*c* and preferably extending exclusively in axial direction A. In order to finally separate plug 13 and socket 11 from one another, in the illustrated embodiment spring element 30*a*, 30*b* has to be compacted again, depending on the stiffness of the spring up to the stop, in order to overcome the holding force between latch section 34 and second counter latch section 36. If latch section 34 and second counter latch section 36 have been brought out of engagement, as shown in FIG. 5*h*, the spring 30*a*, 30*b* decompresses again. Plug 13 and socket 11 can now be finally moved away from one another.

The spring mechanism 30 can also be configured to store spring energy during connection or attachment of plug 13 and socket 11 by means of the same spring elements 30*a*, or an additional spring element, in order to release it for sudden establishment of the contact between plug contact and socket contact 16*a*. This can be explained as follows based on FIGS. 5*a*-5*h* in reversed order.

The sleeve 20 is moved over socket housing 12, as illustrated in FIG. 5*h*. The cam 28 is inserted into the separation section 22*b*. Now the resistance between latch section 34 and inlet 42 of holding cavity 32 can be overcome indirectly by means of the axial movement of sleeve 20 or directly by inserting plug 13 and pressing in attachment direction, in order to bring latch section 34 and second counter latch section 36 into engagement, as shown in FIG. 5*g*. The plug contact 15 and the socket contact 16*a* are thereby in a distance that does not allow spark formation between plug contact 15 and socket contact 16*a*. The sleeve 20 is now rotated in order to guide cam 28 through the deceleration section 22*b*. A further insertion of holding extension 33 into holding cavity 32 is, however, only possible against the resistance between latch section 34 and second counter latch section 36. This force for disengagement of latch section 34 and second counter latch section 36 in attachment direction can be transferred to the holding extension 33 via plug 13 by means of rotation movement on sleeve 20 similar to a thread due to the transmission behavior between cam 28 and separation section 22*b*. Alternatively or additionally, this movement can at least be supported by pressing plug 13 in attachment direction. If a sleeve 20 is rotated in order to guide cam 28 through deceleration section 22*b*, the spring mechanism 30 with the spring element 30*a*, 30*b* mentioned above in connection with the description of separation or an additional spring element can contribute that contact between plug contact 15 and socket contact 16*a* is suddenly established. For this purpose mechanical energy is stored by means of spring mechanism 30 during guidance of cam 28 through the deceleration section 22*b* in closing direction, whereby spring mechanism 30 releases its energy during the phase of disengagement of latch section 34 and second counter latch section 36 and engagement of latch section 34 and first counter latch section 35. As a consequence, the electrical contact between plug contact 15 and socket contact 16*a* is suddenly established.

For securing the connection, cam 28 can be guided through the locking section 22*a* in closing direction and can be preferably latched into cavity 26.

A plug connection device 10 is disclosed having a plug 13 comprising a plug housing 14 and at least one plug contact 15 held in the plug housing 14 in an insulated manner, having a socket 11 comprising a socket housing 12 and a socket contact 16*a*. The socket housing 12 comprises a plug channel configured in an electrically insulated manner for receiving the plug contact 15 in which plug channel the socket contact 16*a* is arranged. On the plug housing 14 or socket housing 12 a sleeve 20 is rotatably arranged. A slotted guide arrangement 21 is arranged to be effective between sleeve 20, plug housing 14 and socket housing 12. A guide slot 22 of the slotted guide arrangement 21 comprises a separation section 22*b* having an inclination relative to a circumferential direction U. In an opening direction after the separation section 22*b* a deceleration section 22*c* is arranged having a lower inclination than the separation section 22*b*.

LIST OF REFERENCE SIGNS

10 plug connection device
11 socket
12 socket housing
13 plug
14 plug housing
15 plug contact
16 plug channel
16*a* socket contact
17 opening
18 opening
19 cylinder surface
20 sleeve
21 slotted guide arrangement
22 guide slot
22*a* locking section
22*b* separation section
22*c* deceleration section
22*d* release section
23 face
24 cylindrical section
26 cavity
27 projection
28 cam
29 cavity
30 spring mechanism
30*a* elastic element
30*b* elastic element
31 holding device
32 holding cavity
33 holding extension
33*a* holding section
33*b* holding section
34 latch section
35 first counter latch section
35*a* flank
36 second counter latch section
36*a* flank
37 latch tooth
38 latch tooth
39 bend
40 cavity
41*a* stop
41*b* stop
42 inlet
A axial direction
U locking section 22*a*

The invention claimed is:

1. A plug connection device, comprising:

a plug comprising a plug housing and at least one electrical plug contact held in the plug housing in an insulated manner, a socket comprising a socket housing and a socket contact, wherein the socket housing comprises a plug channel configured in an electrically insulated manner in which the socket contact is arranged, for receiving the at least one electrical plug contact, wherein a sleeve is rotatably arranged on the plug housing or the socket housing, a slotted guide arrangement arranged to be effective between the sleeve, the plug housing and the socket housing, a guide slot having a separation section and a deceleration section arranged after the separation section in an opening direction, the separation section having an inclination relative to a circumferential direction and the deceleration section having a lower inclination relative to the circumferential direction than the inclination of the separation section, wherein the plug and the socket comprise a latch device having a latch section and a first counter latch section and a second counter latch section and the latch section is brought into engagement with the second counter latch section during guidance of a cam through the separation section.

2. The plug connection device according to claim 1 further comprising a spring mechanism that is arranged to be effective between the sleeve, the plug housing and the socket housing and the spring mechanism is configured to store movement energy during movement of the sleeve for separation of the plug and the socket in order to release the movement energy during a continued separation movement.

3. The plug connection device according to claim 1, wherein the socket or the plug comprises a holding cavity for receiving a holding extension of the plug or the socket.

4. The plug connection device according to claim 3, wherein the latch section is arranged on the holding extension and wherein the first counter latch section is arranged at a first position and the second counter latch section is arranged at a second position in the holding cavity.

5. The plug connection device according to claim 2, wherein during guidance of the cam through the separation section the at least one electrical plug contact and the socket contact are driven away from one another at least partly due to energy released from the spring mechanism.

6. The plug connection device according to claim 2, wherein at a location along a separation path of the plug and the socket a force for separating the at least one electrical plug contact and the socket contact applied by the spring mechanism is larger than a friction force between the latch section and a support of the first counter latch section and the second counter latch section.

7. The plug connection device according to claim 2, wherein a cavity is formed between the separation section and the deceleration section in which the cam engages, during an explosion between the at least one electrical plug contact and the socket contact, in order to inhibit or temporarily block a further movement of the sleeve in the opening direction.

8. The plug connection device according to claim 7, wherein if the cam has engaged the cavity, the cam can be brought into disengagement with the cavity against a spring force of the spring mechanism, so that at least the spring force has to be applied for movement of the sleeve in the opening direction.

9. The plug connection device according to claim 1, further comprising a locking section of the guide slot, wherein the separation section is arranged after the locking section in the opening direction, wherein the locking section blocks a separation movement of plug contact relative to the socket contact.

10. The plug connection device according to claim 1, wherein the guide slot comprises a release section that allows a further movement of the at least one electrical plug contact and the socket contact relative to each other in a separation direction.

11. A plug or socket for a plug connection device according to claim 1.

12. The plug connection device according to claim 2, wherein the socket or the plug comprises a holding cavity for receiving a holding extension of the plug or the socket.

13. The plug connection device according to claim 12, wherein the latch section is arranged on the holding extension and wherein the first counter latch section is arranged at a first position and the second counter latch section is arranged at a second position in the holding cavity.

14. The plug connection device according to claim 13, wherein during guidance of the cam through the separation section the at least one electrical plug contact and the socket contact are driven away from one another at least partly due to energy released from the spring mechanism.

15. The plug connection device according to claim 14, wherein at a location along a separation path of the plug and the socket a force for separating the at least one electrical plug contact and the socket contact applied by the spring mechanism is larger than a friction force between the latch section and a support of the first counter latch section and the second counter latch section.

16. The plug connection device according to claim 15, wherein a cavity is formed between the separation section and the deceleration section in which the cam engages, during an explosion between the at least one electrical plug contact and the socket contact, in order to inhibit or temporarily block a further movement of the sleeve in the opening direction.

* * * * *